UNITED STATES PATENT OFFICE.

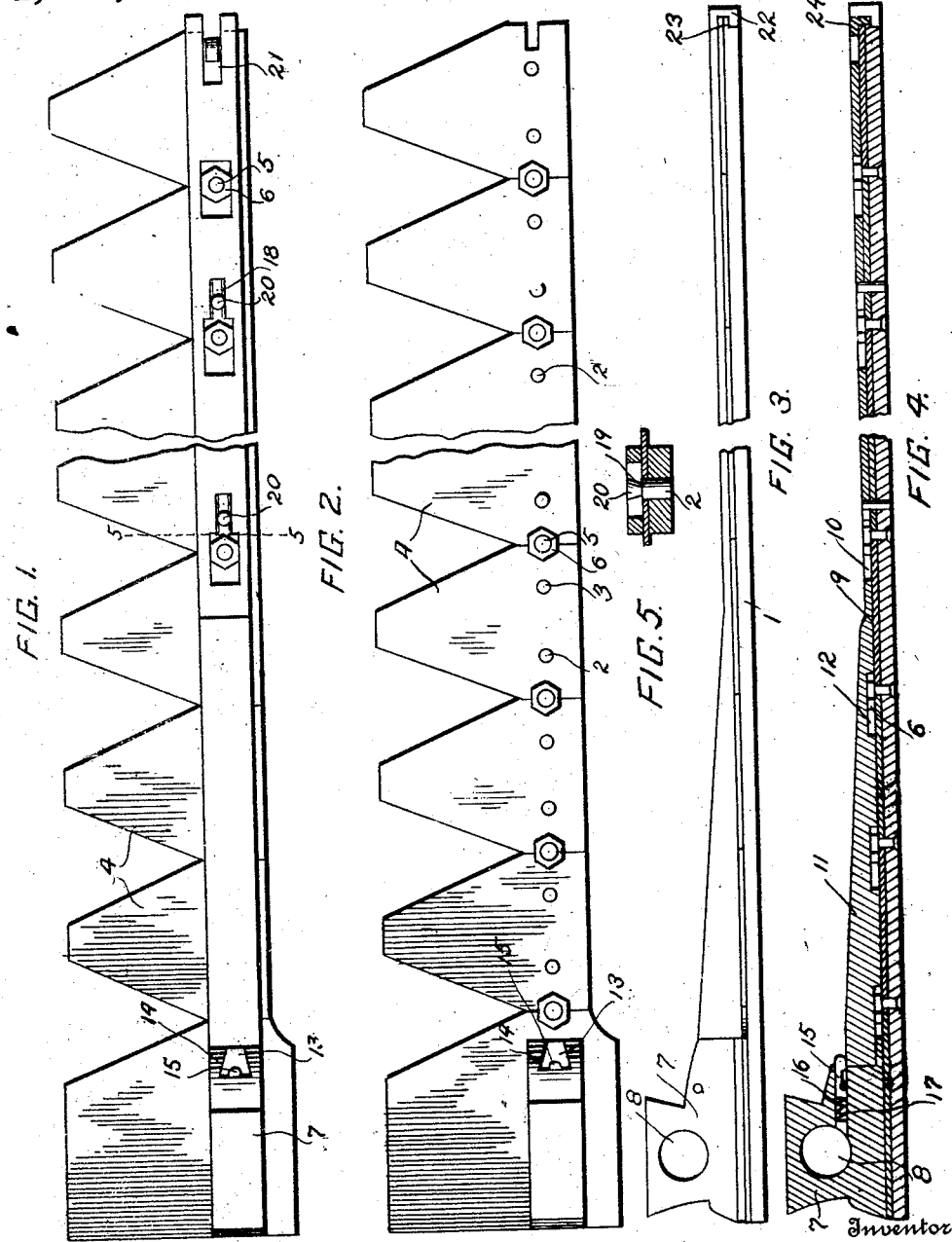

AMBER R. CONNER, OF MEREDITH CENTER, NEW HAMPSHIRE.

CUTTER-BAR.

1,049,675.

Specification of Letters Patent.   Patented Jan. 7, 1913.

Application filed April 17, 1912. Serial No. 691,380.

*To all whom it may concern:*

Be it known that I, AMBER R. CONNER, a citizen of the United States, residing at Meredith Center, in the county of Belknap and State of New Hampshire, have invented certain new and useful Improvements in Cutter-Bars, of which the following is a specification.

My invention relates to cutter bars for mowers and reapers, and has for its object the provision of improved means for securing the cutting blades to the bar, to the end that said blades may be quickly removed for replacing defective teeth, and consists essentially of threaded projections on the bar that are engaged by nuts that hold the teeth in engagement with the bar and provide a locking device for holding the nuts from unscrewing that is securely fastened to the bar and teeth.

My invention will be described in detail hereinafter and illustrated in the accompanying drawings, in which, Figure 1 is a top plan view of a bar constructed in accordance with my invention showing the locking device in place; Fig. 2, a similar view with the locking device removed; Fig. 3, a side view of the bar shown in elevation; Fig. 4, a longitudinal sectional view; and Fig. 5 is a cross section on the line 5—5 of Fig. 1.

In the drawings, similar reference characters will be used to designate corresponding parts throughout the several views.

Heretofore, in securing the cutting blades to the cutter bars of mowing machines, it has been the practice to rivet the blades to the bar, making it necessary to remove the rivets when it is desired to replace a broken or defective tooth, and because of the inconvenience, has made this manner of fastening the cutter blades to the bar objectionable. In my invention, the cutting blades are so secured to the bar that they may be quickly removed and replaced as desired, said substitution of new teeth for broken ones being made in the fields if necessary.

In the embodiment of my invention as shown in the drawings. 1 indicates the bar having pins 2 secured thereto and adapted to engage openings 3 in the cutter blades 4. 5 indicates threaded pins also secured to the bar and engaging notches in the edges of said blades 4. 6 indicates nuts mounted on said threaded pins 5 and engaging the upper faces of the blades 4 to hold them in engagement with the bar 1.

7 indicates a shoulder on the end of the bar 1 and having an opening 8 therein to receive the pitman for reciprocating the bar in the ordinary manner.

To prevent the nuts 6 from unscrewing, I provide a plate 9 of flexible material, such as steel, having elongated slots 10 therein that engage the sides of said nuts to hold them from rotation. One end of said plate 9 is formed with a thickened portion 11 having elongated sockets in its under side indicated at 12 to receive nuts 6 and its end formed with a dove-tail projection 13 that engages a dove-tail socket 14 in the shoulder 7.

15 indicates a plunger mounted in the horizontal openings 16 in the shoulder 7 and having a spring 17 mounted therein that engages said plunger 15 to hold it normally projected from the openings 16 to engage the upper face of the dove-tail projection 13 and hold it from withdrawal from the dove-tail groove 14 in the shoulder 7.

18 indicates slots formed as a continuation of slots 10 and having inclined sides 19 that engage inclined heads 20 on some of the pins 2.

The end of the plate 9 is formed with bifurcations as shown at 21 and the two sides of said plate at the end are formed with downwardly extending angular projections 22 that engage notches 23 in the outer ends of the bar 1.

24 indicates a hook secured to the outer end of the bar 1 and projecting above its upper surface and adapted to engage the outermost of the cutter blades 4, and in combination with the threaded pin 5 at the other end of said blade and the nut 6 mounted thereon holding said blade in engagement with the cutter bar. The upper portion of said hook 24 engages the slot 21 in the end of the plate 9 and acts as a guide in placing said plate in position on the bar.

It will be understood from this description and inspection of the drawings that when it is desired to remove one of the cutting blades for any purpose, the plunger 15 is pushed back in the opening 16 against the resistance of spring 17, thus permitting the end 11 of the plate 9 to be raised from engagement with the shoulder 7. The plate 9 may then be moved outwardly in the direction of the outer end of the bar 1 until the heads 20 of the pins 2 are released from engagement with the slots 18 and the plate 9 may then be raised from engagement with the blades. The nuts 6 may then be unscrewed from the pins 5 and the blade removed from the bar for replacing a defective blade. In replacing the plate 9, the reverse of the operation above described is carried out, and when the dove-tail projection 13 is in engagement with the dove-tail slot 14, in the shoulder 7 and the plunger 15 engages the upper surface of the extension 11, the device will be in an assembled position.

Having thus described my invention, what I claim is:—

1. In a cutter bar, a bar, threaded pins secured to said bar, cutter blades mounted on said bar and having notches to receive said pins, nuts mounted on said pins and resting on top of said blades, a plate engaging said blades and having slots therein to engage said nuts and hold them from rotation, said plate also having slots therein communicating with the first mentioned slots and having inclined sides, pins secured to the bar and having heads with inclined sides to engage the inclined sides of said slots, a shoulder on the end of the bar and formed with a socket, the end of said plate engaging said socket, and a spring actuated plunger mounted in said shoulder and engaging said plate to hold it from displacement.

2. A cutter bar comprising a bar having threaded pins secured thereto, other pins secured to said bar and projecting thereabove, cutter blades formed with openings to engage the last mentioned pins and having notches in their edges to engage said threaded pins, nuts mounted on said threaded pins, a plate having slots engaging said nuts and other slots communicating with the first mentioned slots and having inclined sides, other pins having heads formed with inclined sides engaging said last mentioned slots, said plate being formed with a dove-tail projection on one end, a shoulder secured to the bar and having a dove-tail socket to receive said dove-tail projection, a plunger slidably mounted in said shoulder and adapted to engage the upper surface of the plate and the outer end of the plate formed with hooks engaging the under side of the bar.

In testimony whereof I affix my signature in presence of two witnesses.

AMBER R. CONNER.

Witnesses:
N. M. CORLISS,
BERTRAM BLAISDELL.